Oct. 1, 1963 A. ROSE ETAL 3,105,923

DECISION ELEMENT CIRCUITS

Filed Sept. 6, 1957 2 Sheets-Sheet 1

Inventors:
Alan Rose
John Edwin Parton
By
Stevens, Davis, Miller & Mosher
Attorneys INVENTORS:
Alan Rose
John Edwin Parton
By Stevens, Davis, Miller + Mosher
attorneys

United States Patent Office 3,105,923
Patented Oct. 1, 1963

3,105,923

DECISION ELEMENT CIRCUITS

Alan Rose, Wollaton, Nottingham, and John Edwin Parton, Beeston, Nottingham, England, assignors, by mesne assignments, to International Business Machines Corporation, New York, N.Y., a corporation of New York

Filed Sept. 6, 1957, Ser. No. 682,514
Claims priority, application Great Britain Sept. 19, 1956
1 Claim. (Cl. 317—134)

This invention is concerned with improvements in or relating to decision elements (or gates) of the kind employed to determine the truth-value of logical functions of one or more propositional variables (herein referred to as variables). Decision-elements may be employed in computers to determine the truth-values of any number of logical functions. When these have been determined further decision elements may be used to determine the truth-values of other logical functions which depend on the logical functions whose truth-values were determined by the original decision elements. The present invention is particularly but not exclusively concerned with a decision element for the determination of the truth-value of a logical function of two non-related variables. The invention is also applicable to the determination of the truth-values of logical functions of one, three, four, or more non-related variables as will appear hereinafter.

It is known that there are eight essentially distinct logical operations on two non-related variables. There are also two important logical operations on one variable (negation and assertium or delay line). In fact there are sixteen logical operations on two variables. Hitherto it has been necessary in computers to provide a separate decision element for each logical operation, or to obtain decision elements for some operations by using several other decision elements together. It will be appreciated that if one type of decision element can be modified to provide truth-values of logical functions of one, two or more non-related variables according to the type of decision element that is required a considerable saving in space and equipment will be achieved in a computer.

The present invention has for one object to provide a decision element which is able to determine the truth-value of any of the ten essentially distinct logical operations on one and two non-related variables.

The ten logical operations referred to are:

| | |
|---|---|
| $\sim a$ | "not" *a* |
| $a \& b$ | *a* "and" *b* |
| $a \vee b$ | *a* "or" *b* |
| $a \rightarrow b$ | "if" *a* "then" *b* or "implication" |
| $a \dashv\!\rightarrow b$ | "not if" *a* "then" *b* or "non-implication" |
| $a \longleftrightarrow b$ | *a* "equivalent" *b* |
| $a \leftarrow\!\mid\!\rightarrow b$ | *a* "not equivalent" *b* |
| $a/b$ | *a* "incompatible" with *b* |
| $a \downarrow b$ | "neither" *a* "nor" *b* or "joint denial" |
| $a^{A}$ | assertium *a* or delay line |

There is an eleventh logical operation whose truth-value depends upon the truth-values of three variables *a, b, c*. It is known as "conditioned disjunction" and may be written [*a, b, c*], the square brackets being an accepted standard notation. If *b* has the truth-value "true" then [*a, b, c*] has the same truth-value as *a* and if *b* has the truth-value "false" then [*a, b, c*] has the same truth-value as *c*.

According to the present invention there is provided apparatus for operating on a plurality of signals corresponding to the variables of a logical function to provide an output corresponding to a predetermined decision element, comprising two signal translation paths associated with a common output; means for feeding the variables of the first term of the function expressed as a conditioned disjunction to one of the paths, means for feeding the variables of the 3rd term of the function so expressed to the other path and means for selecting one only at a time of the paths for association with the output while inhibiting association of the other path with the output according to the truth value of the second term of the function so expressed.

The expression "signal transmission path" means a path which is able to receive signals corresponding to a variable of a logical function and transmit the signal in such manner as to enable the output from the path to provide the truth-value of the function. The two paths may for example be electrical conducting wires joined to a change over switch such that only one of the paths can be connected to an output wire at a time. The variables of the second term of the function expressed as a conditioned disjunction may be fed to means which determine the position of the switch such as for example a circuit incorporating an electro-magnetic relay arranged to actuate the switch. If desired the variables of the second term may be common to the two paths. For example two magnetic cores may be employed in such manner as to give an output to a common output wire. The variables of the first and last terms of the function expressed as a conditioned disjunction are each fed to one of the cores while the variables of the second term are fed to both cores so as to prevent both cores from giving an output simultaneously.

According to the present invention there is provided apparatus comprising a circuit for a decision element having at least four independent inputs, each input associated with at least one two state device, the truth-value of one only independent variable being associated with each input, the truth-values of one or more of the variables being variable which input for said variables are directly associated with the output while the truth-values of the remaining variables are pre-set according to the type of decision element required.

The expression "two state device" as used herein means a device which is capable of being in one of two states at any given time. For example it may be an electrical switch which has two positions only or it may be a thermionic valve or transistor which can either conduct or not conduct. It may also be a rectifier which can either conduct or not conduct. It may also be a magnetic core having a rectangular hysteresis curve and being also magnetized clockwise or an equivalent magnetization anti-clockwise. It will be appreciated that "a two state device" may be embodied in many other ways.

It may also be an electromagnetic relay having a change over contact such that when the relay is energised the contact is in one position and when not energised in the other position.

It will be appreciated that there may be one two state device associated with each of the inputs; i.e. four inputs, four two state devices. Alternatively there may be one two state device common to two or more inputs.

A double triode thermionic valve or a magnetic core having two or more windings some of different turns and some in reverse direction may be mentioned as examples of two state devices which can be made common to several inputs.

It will be appreciated that in general two of the inputs are associated with the variable truth-values of two variables. In some instances a variable may be fed to more than one input as will be illustrated later. In the case of the logical operation "not" only one variable associated with one input is required. It may be advantageous to use more than four inputs each of which is associated with a two state device as aforementioned. There is an independent variable associated with each input and for example if the truth-values of two of the variables are variable and five inputs are available the truth-values of the remaining three variables will be determined and pre-set according to the type of decision element required.

Logical formulae having more than four non-related variables may have their truth-values determining according to apparatus of the present invention.

For example certain six variable functions may be written as a conditioned disjunction with a single variable for the first and last terms and a four variable function for the centre term.

The circuit for determining the truth-values will have six inputs.

In order that the invention may be better understood it is necessary to explain that the truth-value tables for each of the above stated eleven logical operations for one, two or three non-related variables may be expressed in terms of a logical function $\Phi$ of four non-related variables in such a way that the symbol $\Phi$ occurs only once in each expression.

It is proposed to consider in this disclosure the logical formula $$<a, b, c, d>$$

which has the same truth-value as the condition disjunction $$[a \longleftrightarrow b, c, \quad a \longleftrightarrow d]$$

By determining the truth-values of the variables occupying two (one in the case of conditioned disjunction and three in the case of negation and assertium) of the four argument places in the above function and placing $a$ and $b$ ($a$, $b$ and $c$ in the case of conditioned disjunction and $a$ in the cases of negation and assertium) in the other two (three in the case of conditioned disjunction and one in the cases of negation and assertium) argument places, truth-value tables for $a$ and $b$ corresponding to those for the eleven logical operations may be produced.

Using the notation

1=true
0=false

Herein the letters $a$, $b$, $c$ etc. are employed to refer to variables of a logical function while P and Q are a syntatical notation of arbitrary logical formulae. These logical operations may be written:

| | | |
|---|---|---|
| $\sim P = df$ | $<P, 0, 0, 0>$ | "not" P |
| $P \& Q = df$ | $<1, P, Q, 0>$ | P "and" Q |
| $P \vee Q = df$ | $<1, 1, Q, P>$ | P "or" Q |
| $P \rightarrow Q = df$ | $<0, 0, Q, P>$ | if P then Q, implication |
| $P -|\rightarrow Q = df$ | $<1, 0, Q, P>$ | not if P then Q, non-implication |
| $P \longleftrightarrow Q = df$ | $<P, 1, Q, 0>$ | P equivalent Q |
| $P \leftarrow|\rightarrow Q = df$ | $<P, 0, Q, 1>$ | P not equivalent Q |
| $P/Q = df$ | $<0, P, Q, 0>$ | P incompatible with Q |
| $P \downarrow Q = df$ | $<0, 1, Q, P>$ | neither P nor Q, joint denial |
| $[P, Q, R] = df$ | $<1, P, Q, R>$ | conditioned disjunction |
| $P^{A} = df$ | $<P, 1, 1, 1>$ | assertium P |

It will be appreciated that these logical operations may be expressed in terms of P, Q, R in other ways than the foregoing.

For example the truth-value of $P \vee Q$ is:

| $P \vee Q$ | 1 | 0 | Q |
|---|---|---|---|
| 1 | 1 | 1 | |
| 0 | 1 | 0 | |
| P | | | |

or rewritten as: $<1, 1, Q, P>$ which is the same as: $[1 \longleftrightarrow 1, Q, 1 \longleftrightarrow P]$. Thus if Q is true the proposition is always true irrespective of P while if Q is false the proposition is true when P is true but false when P is false.

Similarly for $P/Q$ the truth-table may be written:

| $P/Q$ | 1 | 0 | Q |
|---|---|---|---|
| 1 | 0 | 1 | |
| 0 | 1 | 1 | |
| P | | | |

or rewritten as: $<0, P, Q, 0>$ which is the same as: $[0 \longleftrightarrow P, Q, 0 \longleftrightarrow 0]$. Thus when Q is true the proposition is true only when P is false while if Q is false the proposition is true for either value of P.

Thus, by a suitable choice of the argument places to be occupied by $a$, $b$, $c$ respectively and a suitable choice of logical constants (0's and 1's) for the other argument places, it is possible to express generally all the eleven logical operations on $a$ and $b$ (on $a$, and on $a$, $b$, $c$ in the respective cases negation and assertium, conditioned disjunction). The logical function having the same truth table as $[a \longleftrightarrow b, c, a \longleftrightarrow d]$ may be used as a delay line to give assertium P which may be expressed as $<P, 1, 1, 1>$ having a truth table

| $P$ | Assertium $P$ |
|---|---|
| 1 | 1 |
| 0 | 0 |

These logical operations may be determined by a circuit, preferably an electric circuit according to the present invention.

Sometimes it is preferable to employ a more general formula having five non-related propositions or variables, e.g.

$$[a, b, c, d, e]$$

which may be rewritten $$[a -|\rightarrow b, \ c, \ d -|\rightarrow e]$$

in the form of a conditioned disjunction and applied to a circuit having five independent inputs.

The foregoing may be extended for the determination of truth-values of logical functions of three non-related variables. Eight variables are necessary and the logical formula may be written as $$<a, b, c, d, t, u, v, w>$$

which has the same truth-table as $$[a \longleftrightarrow [b, c, d], \quad t, u \longleftrightarrow [v, c, w]]$$

From this logical formula we can obtain a formula containing no variables other than $a$, $b$, $c$, having the truth-table of any logical function of $a$, $b$, and $c$, or any of the truth-tables obtained from the previous decision elements. This is usually accomplished by selecting three of the eight argument places to be occupied by $a$, $b$, $c$, respectively (the selection depending on the logical function desired), and then filling the remaining five argument places with suitably chosen logical constants (0's and 1's).

For example $a \& b \& c$ may be expressed as $$<1, a, b, 0, c, 1, 0, 0>$$

and $(a \longleftrightarrow b) \vee c$ may be expressed as $$<1, 1, b, 1, c, a, 1, 0>$$

Alternative forms of expressing the logical functions of two variables are given by the formulae:

$$[f_1(a, b), c, f_2(d, e)]$$

where $f_1$ and $f_2$ may be any of: $\longleftrightarrow$, $\leftarrow|\rightarrow$, $\rightarrow$, $-|\rightarrow$. $f_1$ and $f_2$ may or may not be the same. The five-variable formula given above is the case of this formula when $f_1$ and $f_2$ are both $-|\rightarrow$.

There are therefore 16 formulae of this general type. If $f_1$ and $f_2$ are both $\longleftrightarrow$ or both $\leftarrow|\rightarrow$ we may identify the variables $a$ and $e$. The same holds if $f_1$ is $\longleftrightarrow$ and $f_2$ is $\leftarrow\!|\!\rightarrow$ or vice versa. The resulting four formulae then have the same truth-tables as $$[a \longleftrightarrow b, c, a \longleftrightarrow d], \quad [a \leftarrow\!|\!\rightarrow b, c, a \leftarrow\!|\!\rightarrow d]$$
$$[a \longleftrightarrow b, c, a \leftarrow\!|\!\rightarrow d], \quad [a \leftarrow\!|\!\rightarrow b, c, a \longleftrightarrow d]$$

respectively. The first of these four formulae has been discussed in detail above.

Four further forms are given by the formulae:

$$[a, f\ (b, c), \sim d]$$

where $f$ may be any of $\longleftrightarrow$, $\leftarrow\!|\!\rightarrow$, $\rightarrow$, $-\!|\!\rightarrow$. Thus one example of these formulae is $[a, b -\!|\!\rightarrow c, \sim d]$. Corresponding to the 20 formulae for functions of 2 variables there are 400 for functions of three variables.

Reference will now be made to the drawing accompanying the disclosure which illustrates a simple relay circuit for determining the truth-value of a function of two non-related variables by means of a four variable formula and to the drawings in the disclosure in which.

Figures 1, 2, 3, 4, 5, 6:
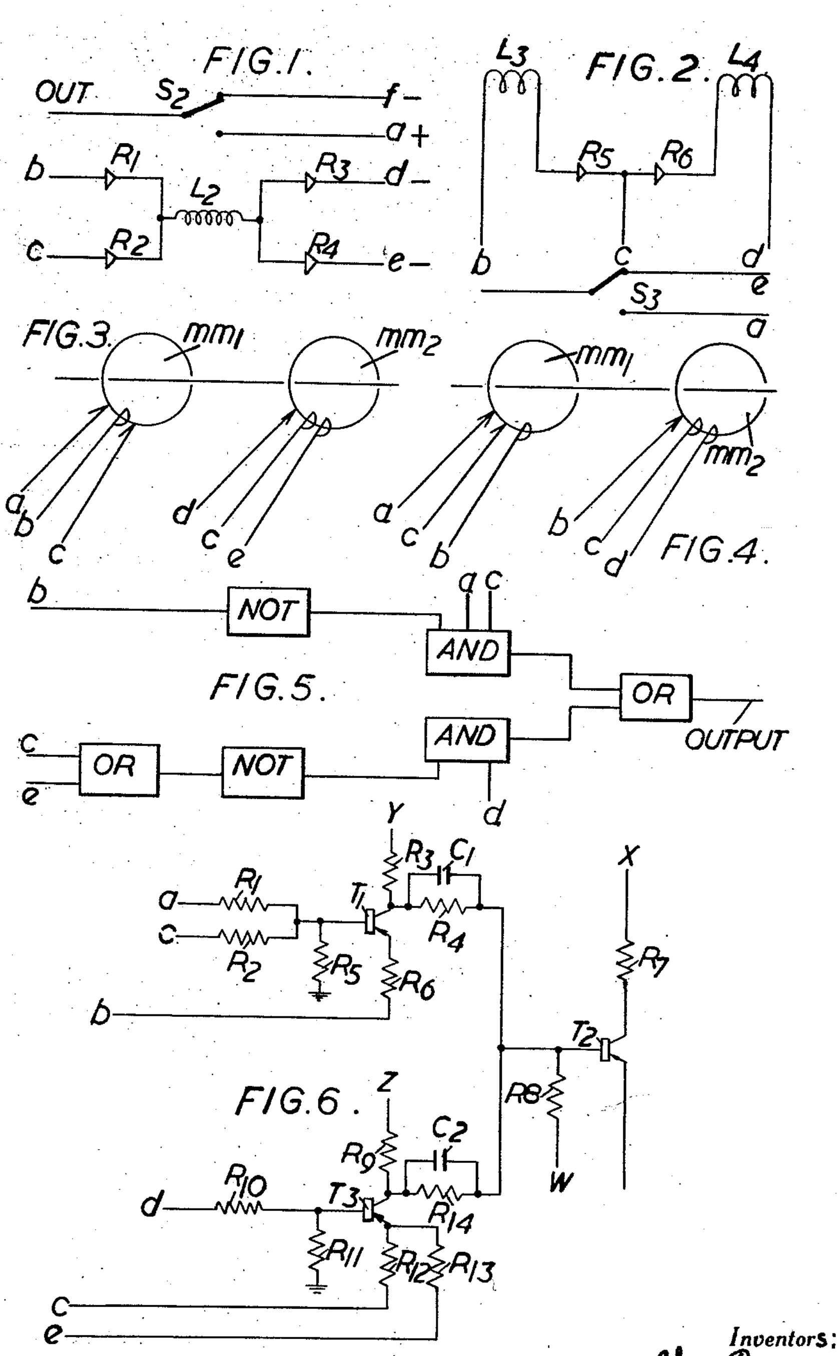
FIGURE 1 is a circuit for determining the truth-value by means of a 6 variable formula.
FIGURE 2 is a circuit for determining the truth-value by means of a 5 variable formula.
FIGURE 3 is a magnetic core circuit for a 5 variable formula.
FIGURE 4 is a magnetic core circuit for a 4 variable formula.
FIGURE 5 is a block diagram of a decision element circuit for a five variable formula, and to this invention.
FIGURE 6 is a practical embodiment of the block diagram of FIGURE 5.
Figure 7:
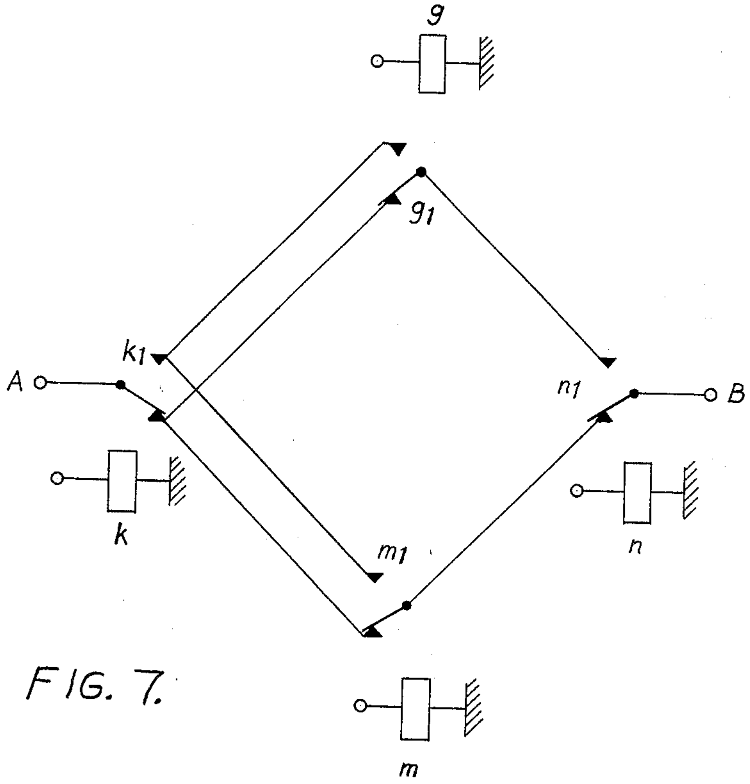
FIGURE 7 is a circuit diagram of a decision element circuit embodying four electro-magnetic relays.

Referring firstly to the drawing which accompanied the disclosure, four electro-magnetic relays $k$, $g$, $m$, $n$, each have a change over contact $k_1$, $g_1$, $m_1$, $n_1$ which are connected to each other as illustrated.

If the truth-value of the logical function is true then there is a short circuit between points A and B. If the truth-value is false then there is an open circuit between points A and B.

Assuming for example it is desired to determine the truth-value of $P \downarrow Q$ which may be rewritten $$[0 \longleftrightarrow 1, Q, 0 \longleftrightarrow P]$$

then if $k$ is not energised the contact $k_1$ will be in the position illustrated and if $g$ is energised the contact $g_1$ will have changed over and if relays $m$ and $n$ are variable according to whether P and Q are true or false respectively it will be observed that a truth-value table of:

| $P \downarrow Q$ | 1 | 0 | Q |
|---|---|---|---|
| 1 | 0 | 0 | |
| 0 | 0 | 1 | |
| P | | | |

will be obtained and that the one condition in which there is a short circuit between A and B is when both relays $m$ and $n$ are not energised thus corresponding to false truth-values of P and Q. We must explain that the signification "0 equivalent to 1" is correctly a false statement and therefore makes the first term of the conditioned disjunction false. It is only by considering the first term always to be false is the above truth value table obtained, i.e., according to that truth table it is only when both P and Q are false is there an output such that if either P or Q are true there is no output.

In the accompanying drawings FIG. 1 is a simple circuit for determining the truth-value of the six variable formula $$[a, (b \vee c)\ \&\ (\sim d \vee \sim e), f] = T\ \Phi\ (a, b, c, d, e, f)$$

Applying the principles enumerated above the truth-value tables may be expressed as follows:

$$P \vee Q = df\ \Phi\ (1, P, Q, 0, 0, 0)$$

| $P \vee Q$ | T | F | Q |
|---|---|---|---|
| T | T | T | |
| F | T | F | |
| P | | | |

$$P \downarrow Q = df\ \Phi\ (0, P, Q, 0, 0, 1)$$

| $P \downarrow Q$ | T | F | Q |
|---|---|---|---|
| T | F | F | |
| F | F | T | |
| P | | | |

$$P/Q = df\ \Phi\ (1, 1, 1, P, Q, 0)$$

| $P/Q$ | T | F | Q |
|---|---|---|---|
| T | F | T | |
| F | T | T | |
| P | | | |

$$P\ \&\ Q = df\ \Phi\ (0, 1, 1, P, Q, 1)$$

| $P\&Q$ | T | F | Q |
|---|---|---|---|
| T | T | F | |
| F | F | F | |
| P | | | |

$$P \rightarrow Q = df\ \Phi\ (0, 0, P, Q, 1, 1)$$

| $P \rightarrow Q$ | T | F | Q |
|---|---|---|---|
| T | T | F | |
| F | T | T | |
| P | | | |

$$P -\!|\!\rightarrow Q = df\ \Phi\ (1, 0, P, Q, 1, 0)$$

| $P -\!\vert\!\rightarrow Q$ | T | F | Q |
|---|---|---|---|
| T | F | T | |
| F | F | F | |
| P | | | |

$$P \leftarrow\!|\!\rightarrow Q = df\ \Phi\ (1, P, Q, P, Q, 0)$$

| $P \leftarrow\!\vert\!\rightarrow Q$ | T | F | Q |
|---|---|---|---|
| T | F | T | |
| F | T | F | |
| P | | | |

$$P \longleftrightarrow Q = df\ \Phi\ (0, P, Q, P, Q, 1)$$

| $P \longleftrightarrow Q$ | T | F | Q |
|---|---|---|---|
| T | T | F | |
| F | F | T | |
| P | | | |

A circuit which determines these truth-values is illustrated in FIG. 1 and comprises four rectifiers $R_1$, $R_2$, $R_3$, $R_4$, and an electromagnetic relay having a coil $L_2$ and a change over contact $S_2$. The inputs from the 6 variables are as illustrated. For a false truth-value there is no output i.e. the output lead is connected to earth while for a true truth-value the output wire is connected to positive potential.

Considering the proposition $$P \vee Q = df\ \Phi\ (1, P, Q, 0, 0, 0)$$

the necessary connections are as follows:

(*a*) is energised i.e. connected to $+ve$ potential
(*b*) variables of P and Q
(*c*)
(*d*)
(*e*) are not energised i.e. connected to $-ve$ potential
(*f*) or earth An output is obtained only when the switch $S_2$ has changed over which occurs only when a current passes through $L_2$. Since neither $d$ nor $e$ are energised $L_2$ will have a current passing through it when either $b$ or $c$ or both are energised. Thus if P is true the proposition is always true, if Q is true the proposition is always true but if P and Q are both false the proposition is false.

By employing the settings of $a$, $b$, $c$, $d$, $e$, and $f$ according to the foregoing the circuit will give the truth-value tables required.

For a five variable formula such as $$[a, (b -\!|\!\rightarrow c) \vee (c -\!|\!\rightarrow d), e]$$

which can be expressed as $$[[e, d, a], c, [a, b, e]]$$

the circuit illustrated in FIG. 2 will determine the truth-values. This circuit comprises two rectifiers $R_5$ and $R_6$ and two electromagnetic coils $L_3$ and $L_4$ which actuate a change over switch $S_3$. The inputs from the five variable function are as shown.

Truth-value tables with settings for the five inputs may be determined in a manner similar to the example described with reference to FIG. 1. It will be appreciated that if $a$ is energised an output is obtained whenever current passes through $L_3$ or $L_4$ while if $e$ is energised an output is obtainable whenever no current passes through either $L_3$ or $L_4$. It can be shown that at least 17 important operations on three variables are possible with the circuits of FIGURES 1 and 2.

FIGURES 3 and 4 each illustrate two magnetic cores $mm_1$ and $mm_2$ arranged together so as to produce an output in the form of pulses in an output wire. Each core is arranged to have a rectangular shape hysteresis envelope and the core either has a clockwise magnetization of predetermined value or an equal strength anti-clockwise magnetization. Each core comprises three windings which are different. The nomenclature employed is $\rightharpoondown$ for a coil wound in the positive sense of weight +1, i.e. one unit turns, $\rightarrow$ for a coil wound in the same sense of weight +2, i. e. two unit turns, and —ᵔ for a coil wound in the negative sense of weight −1, i.e. one unit turns in the opposite direction.

Connection to the coils of the weights illustrated enable the following function to be determined:

$$[a \text{-}|\!\!\rightarrow b, c, d \text{-}|\!\!\rightarrow e] =_T (a \,\&\, {\sim}b \,\&\, c) \vee ({\sim}c \,\&\, d \,\&\, {\sim}e)$$

The function $(a \,\&\, {\sim}b \,\&\, c)$ is given by the connections to the coil $mm_1$ of FIG. 3, since $a$ and $c$ are both in the positive sense and $b$ is in the negative sense.

Similarly the function $({\sim}c \,\&\, d \,\&\, {\sim}e)$ is given by the coil $mm_2$ of FIG. 3 in which $c$ and $e$ are both in the negative sense while $d$ is of weight +2 in the positive sense.

In use there is a fixed bias to the core of weight −1 so that to obtain an output it is necessary to apply to the core a total weight of +2 and since the two formulae above both cannot have the truth-value TRUE simultaneously only one core can give an output at a time.

Assume it is desired to determine the truth-value of $P\downarrow Q$ $$P\downarrow Q = df\ \Phi\ (0, 0, Q, 1, P)$$

or $$[0 \text{-}|\!\!\rightarrow 0, Q, 1 \text{-}|\!\!\rightarrow P]$$

The two inputs $a$ and $b$ are left on open circuit and input $d$ is pulsed: the first core cannot have weight +2 and therefore has no output. An output from the second core is obtainable if the input on $d$ is not inhibited by an input on either $c$ or $e$.

Thus if $r$ and $t$ are variable a truth-value table of

| $P\downarrow Q$ | 1 | 0 | $Q$ |
|---|---|---|---|
| 1 | 0 | 0 | |
| 0 | 0 | 1 | |
| $P$ | | | |

is obtained.

The function $[a, b \rightarrow c, {\sim}d]$ may be rewritten as $$[a, b \rightarrow c, {\sim}d] =_T (a \,\&\, ({\sim}b \vee c)) \vee (b \,\&\, {\sim}c \,\&\, {\sim}d)$$

The terms of the first bracket are given by the core $mm_1$ of FIG. 4, while the terms of the second bracket are given by the core $mm_2$ of FIG. 4 (see above).

If we define the truth table of the logical function $\Phi$ by $$\Phi\ (a, b, c, d) =_T [a, b \rightarrow c, {\sim}d]$$

we may make the definition $$P \vee Q = df\ \Phi\ (P, Q, 0, 0)$$

Thus if $c$ and $d$ are not pulsed, an output is obtained from $mm_1$ if and only if the variable P is fed to $a$ and Q is not fed to $b$. Further an output is obtained from $mm_2$ if and only if Q is fed to $b$. Thus if P and Q are both variable a truth-value table of

| $P \vee Q$ | 1 | 0 | $Q$ |
|---|---|---|---|
| 1 | 1 | 1 | |
| 0 | 1 | 0 | |
| $P$ | | | |

is obtained. In no circumstances can both cores give an output simultaneously since the formulae $(a \,\&({\sim}b \vee c))$, $(b \,\&\, {\sim}c \,\&\, {\sim}d)$ cannot take the truth-value true simultaneously.

From the foregoing example it will be appreciated how the magnetic core circuits may be constructed to provide truth-value tables for predetermined decision elements.

FIGURES 5 and 6 illustrate how practical circuits are formed for the obtaining of truth-value tables for predetermined decision elements by employing known types of logical formula gates.

The block diagram of FIG. 5 is illustrative of the formula $$[a \text{-}|\!\!\rightarrow b, c, d \text{-}|\!\!\rightarrow e]$$

or $$(a \,\&\, {\sim}b \,\&\, c) \vee (d \,\&\, {\sim}e \,\&\, {\sim}c)$$

A practical embodiment of this block diagram is illustrated in FIG. 6 in which the components have the following values:

| | Ohms |
|---|---|
| $R_1$ | 10,000 |
| $R_2$ | 10,000 |
| $R_3$ | 15,000 |
| $R_4$ | 39,000 |
| $R_5$ | 6,800 |
| $R_6$ | 2,200 |
| $R_7$ | 15,000 |
| $R_8$ | 100,000 |
| $R_9$ | 15,000 |
| $R_{10}$ | 10,000 |
| $R_{11}$ | 10,000 |
| $R_{12}$ | 4,700 |
| $R_{13}$ | 4,700 |
| $R_{14}$ | 39,000 |

| | Pf. |
|---|---|
| $C_1$ | 150 |
| $C_2$ | 150 |

and potentials are applied as follows:

| | Volts |
|---|---|
| X | −9 |
| Z | −9 |
| Y | −9 |
| W | +3 |

$T_1$, $T_2$ and $T_3$ are transistors.

It will be appreciated from the foregoing examples with reference to FIGS. 1–4 how the truth-value table for this function is given by the circuits illustrated in FIGS. 5 and 6.

It will be appreciated from the foregoing how by expressing a logical function as a conditioned disjunction it is possible to feed the variables of the first and third terms to paths which are associated with a common output such that at no time can both paths be associated with the output simultaneously. Thus if the variables of the second term are employed to determine which of the two paths is associated with the output according to the truth value of the second term a circuit for a predetermined decision element is obtained.

It will also be appreciated from the foregoing that it is possible to apply the truth-values of two, three, four or more non-related variables to two, three, four or more inputs each associated with a two state device and to preset the truth-values of the other variables so as to determine the truth-value table for the variables under the stated conditions and in consequence a simple decision element is provided which may be adapted to provide truth-value tables for different logical formulae.

What we claim is:

Apparatus for operating on a plurality of electrical signals corresponding to variables of a logical function expressed as a conditioned disjunction to provide an output signal corresponding to a predetermined logical decision function including a two position change-over switch means comprising two signal transmission circuits associated with a common signal output means, means for applying the variables of the first term of the conditioned disjunction to one of said circuits, means for applying the variables of the third term of the conditioned disjunction to the other circuit and means for selecting one only at a time of said circuits for connection with said signal output means while inhibiting connection of the other circuit with said signal output means according to the truth-value of the second term of the conditioned disjunction, said apparatus having six signal input means, a rectifier separately connected with each of at least four of the six signal input means and an electromagnetic coil common connected to the four of said six signal input means, which electromagnetic coil when energized actuates said change-over switch means from one position to another, the remaining two signal input means each being connected with one of the two positions of said change-over switch.

References Cited in the file of this patent

UNITED STATES PATENTS

| | | |
|---|---|---|
| 2,719,961 | Karnaugh | Oct. 4, 1955 |
| 2,741,758 | Cray | Apr. 10, 1956 |
| 2,779,934 | Minnick | Jan. 29, 1957 |
| 2,799,450 | Johnson | July 16, 1957 |
| 2,802,202 | Lanning | Aug. 6, 1957 |
| 2,803,401 | Nelson | Aug. 20, 1957 |
| 2,815,488 | Von Neumann | Dec. 3, 1957 |
| 2,820,897 | Dean et al. | Jan. 21, 1958 |
| 2,864,961 | Lohman et al. | Dec. 16, 1958 |
| 2,905,934 | Flint | Sept. 22, 1959 |
| 2,922,996 | Young | Jan. 26, 1960 |

OTHER REFERENCES

Montgomerie: Sketch for an Algebra of Relay and Contactor Circuits, Institution of Electrical Engineers, vol. 95, part II, February 1948, pages 355 to 357.

Church, A.: "Portugaliae Mathematica," vol. 7, pp. 87–90, 1948.

Kalin: Formal Logic and Switching Circuits, Proc. Asso. for Computing Machinery, May 1952, pages 251 to 257.

Washburn: An Application of Boolean Algebra to the Design of Electronic Switching Circuits, AIEE Transactions, Communications and Electronics, September 1953, pages 380 to 388.

Richards, R. K.: "Arithmetic Operation in Digital Computers," D. Van Nostrand Co., Inc., New York, 1955, pp. 26–80.